(12) United States Patent
Meng et al.

(10) Patent No.: US 11,527,238 B2
(45) Date of Patent: Dec. 13, 2022

(54) INTERNAL LANGUAGE MODEL FOR E2E MODELS

(71) Applicant: Microsoft Technology Licensing, LLC, Redmond, WA (US)

(72) Inventors: Zhong Meng, Mercer Island, WA (US); Sarangarajan Parthasarathy, Mountain View, CA (US); Xie Sun, Kirkland, WA (US); Yashesh Gaur, Redmond, WA (US); Naoyuki Kanda, Bellevue, WA (US); Liang Lu, Redmond, WA (US); Xie Chen, Bellevue, WA (US); Rui Zhao, Bellevue, WA (US); Jinyu Li, Bellevue, WA (US); Yifan Gong, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 38 days.

(21) Appl. No.: 17/154,956

(22) Filed: Jan. 21, 2021

(65) Prior Publication Data
US 2022/0139380 A1   May 5, 2022

Related U.S. Application Data

(60) Provisional application No. 63/108,180, filed on Oct. 30, 2020.

(51) Int. Cl.
*G10L 15/16* (2006.01)
*G06N 3/04* (2006.01)
(Continued)

(52) U.S. Cl.
CPC ........... *G10L 15/16* (2013.01); *G06N 3/049* (2013.01); *G10L 15/01* (2013.01); *G10L 15/063* (2013.01); *G10L 15/183* (2013.01)

(58) Field of Classification Search
CPC .... G06N 3/0445; G06N 3/0454; G06N 3/049; G10L 15/16; G10L 15/063; G10L 15/183; G10L 25/30; G10L 15/01
See application file for complete search history.

(56) References Cited

U.S. PATENT DOCUMENTS 10,540,585 B2 * 1/2020 Norouzi ............... G06N 3/0454
10,573,295 B2 * 2/2020 Zhou .................... G06N 3/084
(Continued)

OTHER PUBLICATIONS

Ba, et al., "Layer Normalization", In repository of arXiv, arXiv:1607.06450, Jul. 21, 2016, 14 Pages.
(Continued)

*Primary Examiner* — Jakieda R Jackson
(74) *Attorney, Agent, or Firm* — Alleman Hall Creasman & Tuttle LLP

(57) ABSTRACT

A computer device is provided that includes one or more processors configured to receive an end-to-end (E2E) model that has been trained for automatic speech recognition with training data from a source-domain, and receive an external language model that has been trained with training data from a target-domain. The one or more processors are configured to perform an inference of the probability of an output token sequence given a sequence of input speech features. Performing the inference includes computing an E2E model score, computing an external language model score, and computing an estimated internal language model score for the E2E model. The estimated internal language model score is computed by removing a contribution of an intrinsic acoustic model. The processor is further configured to compute an integrated score based at least on E2E model score, the external language model score, and the estimated internal language model score.

20 Claims, 9 Drawing Sheets

(51) Int. Cl.
G10L 15/01 (2013.01)
G10L 15/06 (2013.01)
G10L 15/183 (2013.01)

(56) References Cited

U.S. PATENT DOCUMENTS

2018/0061439 A1* 3/2018 Diamos .................. G10L 15/24
2021/0110254 A1* 4/2021 Hoang ................. G06N 3/0454
2021/0312906 A1* 10/2021 Kuo ..................... G06N 3/0454
2021/0343219 A1* 11/2021 Bogdanowicz, Ph.D. ..................
G09G 3/2003

OTHER PUBLICATIONS

Bahdanau, et al., "End-to-End Attention-based Large Vocabulary Speech Recognition", In Proceedings of the IEEE International Conference on Acoustics, Speech and Signal Processing, Mar. 20, 2016, pp. 4945-4949.

Bengio, et al., "Scheduled Sampling for Sequence Prediction with Recurrent Neural Networks", In Proceedings of the 28th International Conference on Neural Information Processing Systems—vol. 1, Dec. 2015, 9 Pages.

Chan, et al., "Listen, Attend and Spell: A Neural Network for Large Vocabulary Conversational Speech Recognition", In Proceedings of the IEEE International Conference on Acoustics, Speech and Signal Processing, Mar. 20, 2016, pp. 4960-4964.

Chiu, et al., "State-of-the-Art Speech Recognition with Sequence-to-Sequence Models", In Proceedings of the IEEE International Conference on Acoustics, Speech and Signal Processing, Apr. 15, 2018, pp. 4774-4778.

Cho, et al., "On the Properties of Neural Machine Translation: Encoder-Decoder Approaches", In repository of arXiv, arXiv:1409.1259, Sep. 3, 2014, 9 Pages.

Chorowski, et al., "Attention-Based Models for Speech Recognition", In Proceedings of the Advances in Neural Information Processing Systems, Dec. 7, 2015, 9 Pages.

Chorowski, et al., "Towards Better Decoding and Language Model Integration in Sequence to Sequence Models", In Journal of Computing Research Repository, Dec. 8, 2016, 6 Pages.

Chung, et al., "Empirical Evaluation of Gated Recurrent Neural Networks on Sequence Modeling", In repository of arXiv, arXiv:1412.3555, Dec. 11, 2014, 9 Pages.

Geoffrey, et al., "Deep Neural Networks for Acoustic Modeling in Speech Recognition: The Shared Views of four Research Groups", In IEEE Signal Processing Magazine, vol. 29, Issue 6, Nov. 2012, pp. 82-97.

Graves, et al., "Connectionist Temporal Classification: Labelling Unsegmented Sequence Data with Recurrent Neural Networks", In Proceedings of the 23rd International Conference on Machine Learning, Jun. 25, 2006, pp. 369-376.

Graves, Alex, "Sequence Transduction with Recurrent Neural Networks", In repository of arXiv, arXiv:1211.3711, Nov. 14, 2012, 9 Pages.

Graves, et al., "Towards End-to-End Speech Recognition with Recurrent Neural Networks", In Proceedings of the 31st International Conference on Machine Learning, Jan. 27, 2014, 9 Pages.

Gulcehre, et al., "On using Monolingual Corpora in Neural Machine Translation", In Repository of arXiv:1503.03535v1, Mar. 11, 2015, 9 Pages.

Hannun, et al., "Deep Speech: Scaling up End-to-end Speech Recognition", In Repository of arXiv:1412.5567v2, Dec. 19, 2014, 12 Pages.

Hori, et al., "Multi-level Language Modeling and Decoding for Open Vocabulary End-to-end Speech Recognition", In Proceedings of the 2017 IEEE Automatic Speech Recognition and Understanding Workshop, Dec. 16, 2017, pp. 287-293.

Jain, et al., "RNN-T for Latency Controlled ASR with Improved Beam Search", In Repository of arXiv:1911.01629v2, Nov. 5, 2019, 5 Pages.

Kanda, et al., "Maximum a Posteriori based Decoding for CTC Acoustic Models", In Proceedings of the 17th Annual Conference of the International Speech Communication Association, Sep. 8, 2016, pp. 1868-1872.

Kanda, et al., "Maximum-a- posteriori-based Decoding for End-to-end Acoustic Models", In IEEE/ACM Transactions on Audio, Speech, and Language Processing, vol. 25, No. 5, May 2017, pp. 1023-1034.

Kannan, et al., "An Analysis of Incorporating an External Language Model into a Sequence-to-Sequence Model", In Proceedings of the IEEE International Conference on Acoustics, Speech and Signal Processing, Apr. 15, 2018, pp. 5824-5828.

Karita, et al., "A Comparative Study on Transformer vs RNN in Speech Applications", In Proceedings of the IEEE Automatic Speech Recognition and Understanding Workshop, Dec. 14, 2019, pp. 449-456.

Li, et al., "Advancing Acoustic-to-Word CTC Model", In the Proceedings of International Conference on Acoustics, Speech and Signal Processing, Apr. 15, 2018, 5 Pages.

Li, et al., "Developing RNN-T Models Surpassing High-performance Hybrid Models with Sustomization Capability", In Repository of arXiv:2007.15188v1, Jul. 30, 2020, 5 Pages.

Li, et al., "On the Comparison of Popular End-to-end Models for Large Scale Speech Recognition", In Proceedings of the 21st Annual Conference of the International Speech Communication Association, Oct. 25, 2020, 5 Pages.

McDermott, et al., "A Density Ratio Approach to Language Model Fusion in End-to-end Automatic Speech Recognition", In Proceedings of the IEEE Automatic Speech Recognition and Understanding Workshop, Dec. 14, 2019, 8 Pages.

Meng, et al., "Domain Adaptation via Teacher-student Learning for End-to-end Speech Recognition", In Proceedings of the IEEE Automatic Speech Recognition and Understanding Workshop, Dec. 14, 2019, pp. 268-275.

Meng, et al., "Internal Language Model Estimation for Domain-adaptive End-to-end Speech Recognition", In Repository of arXiv:2011.01991v1, Nov. 3, 2020, 8 Pages.

Meng, et al., "Speaker Adaptation for Attention-based End-to-end Speech Recognition", In Proceedings of the 20th Annual Conference of the International Speech Communication Association, Sep. 15, 2019, pp. 241-245.

Mnih, et al., "A Fast and Simple Algorithm for Training Neural Probabilistic Language Models", In Proceeding of the 29th International Conference on Machine Learning, Jun. 26, 2012, 8 Pages.

Panayotov, et al., "Librispeech: An ASR Corpus Based on Public Domain Audio Books", In Proceeding of the International Conference on Acoustics, Speech and Signal Processing, Apr. 19, 2015, 5 Pages.

Paszke, et al., "Automatic differentiation in PyTorch", In Proceedings of the 31st Conference on Neural Information Processing Systems, Dec. 4, 2017, 4 Pages.

Sainath, et al., "A Streaming On-Device End-to-end Model Surpassing Server-Side Conventional Model Quality and Latency", In Proceedings of the IEEE International Conference on Acoustics, Speech and Signal Processing, May 2020, 6 Pages.

Sennrich, et al., "Neural Machine Translation of Rare Words with Subword Units", In Repository of arXiv:1508.079092, Nov. 27, 2015, 11 Pages.

Shan, et al., "Component Fusion: Learning Replaceable Language Model Component for End-to-end Speech Recognition System", In Proceedings of the IEEE International Conference on Acoustics, Speech and Signal Processing, May 12, 2019, 5 Pages.

Soltau, et al., "Neural Speech Recognizer: Acoustic-to-word LSTM Model for Large Vocabulary Speech Recognition", In Proceedings of the 17th Annual Conference of the International Speech Communication Association, Sep. 8, 2016, 6 Pages.

Sriram, et al., "Cold Fusion: Training Seq2Seq Models together with Language Models", In Proceedings of the 19th Annual Conference of the International Speech Communication Association, Sep. 2, 2018, pp. 387-391.

Srivastava, et al., "Dropout: A Simple Way to Prevent Neural Networks from Overfitting", In Journal of Machine Learning Research, vol. 15, Issue 1, Jun. 2014, pp. 1929-1958.

(56) References Cited

OTHER PUBLICATIONS

Stahlberg, et al., "Simple Fusion: Return of the Language Model", In Repository of arXiv:1809.00125v1, Sep. 1, 2018, 8 Pages.

Toshniwal, et al., "A Comparison of Techniques for Language Model Integration in Encoder-Decoder Speech Recognition", In Proceedings of the IEEE Spoken Language Technology Workshop, Dec. 18, 2018, pp. 369-375.

Variani, et al., "Hybrid Autoregressive Transducer (Hat)", In Proceedings of the IEEE International Conference on Acoustics, Speech and Signal Processing, May 4, 2020, pp. 6139-6143.

Bell, et al., "Adaptation Algorithms for Speech Recognition: An Overview", In Repository of arXiv:2008.06580v1, Aug. 14, 2020, 30 Pages.

Lu, et al., "On Minimum Word Error Rate Training of the Hybrid Autoregressive Transducer", In Repository of arXiv:2010.126731, Oct. 23, 2020, 5 Pages.

"International Search Report and Written Opinion Issued in PCT Application No. PCT/US21/048310", dated Dec. 14, 2021, 12 Pages.

* cited by examiner

| TRAIN LOSS | EVALUATION METHOD | MODEL PARAMS | LIBRISPEECH | | | IN-HOUSE DICTATION | | | IN-HOUSE CONVERSATION | | |
|---|---|---|---|---|---|---|---|---|---|---|---|
| | | | DEV WER | TEST WER | TEST WERR | DEV WER | TEST WER | TEST WERR | DEV WER | TEST WER | TEST WERR |
| RNN-T | NO LM | 76M | 9.27 | 8.97 | - | 23.40 | 16.16 | - | 14.92 | 14.26 | - |
| | SHALLOW FUSION | 134M | 7.44 | 7.53 | 16.1 | 22.19 | 15.77 | 2.4 | 14.88 | 14.08 | 1.3 |
| | DENSITY RATIO | 191M | 6.80 | 6.74 | 24.9 | 21.54 | 15.64 | 3.2 | 14.76 | 14.20 | 0.4 |
| | ILME | 134M | 6.41 | 6.36 | 29.1 | 21.04 | 14.70 | 9.0 | 14.61 | 14.03 | 1.6 |
| ILMT | NO LM | 76M | 8.58 | 8.37 | 6.7 | 22.61 | 15.73 | 2.7 | 14.00 | 13.59 | 4.7 |
| | SHALLOW FUSION | 134M | 6.60 | 6.47 | 27.9 | 21.31 | 15.04 | 6.9 | 13.83 | 13.29 | 6.8 |
| | DENSITY RATIO | 191M | 5.86 | 5.61 | 37.5 | 20.61 | 14.76 | 8.7 | 13.71 | 13.29 | 6.8 |
| | ILME | 134M | 5.57 | 5.30 | 40.9 | 19.94 | 13.97 | 13.6 | 13.32 | 12.96 | 9.1 |

FIG. 3

| TRAIN LOSS | EVALUATION METHOD | MODEL PARAMS | LIBRISPEECH | | | IN-HOUSE DICTATION | | | IN-HOUSE CONVERSATION | | |
|---|---|---|---|---|---|---|---|---|---|---|---|
| | | | DEV WER | TEST WER | TEST WERR | DEV WER | TEST WER | TEST WERR | DEV WER | TEST WER | TEST WERR |
| AED | NO LM | 97M | 8.56 | 8.61 | - | 20.17 | 14.08 | - | 14.05 | 13.43 | - |
| | SHALLOW FUSION | 155M | 5.00 | 5.33 | 38.1 | 18.55 | 12.96 | 8.0 | 13.45 | 12.95 | 3.6 |
| | DENSITY RATIO | 212M | 4.74 | 5.09 | 40.9 | 18.76 | 12.89 | 8.5 | 13.55 | 12.95 | 3.6 |
| | ILME | 155M | 4.42 | 4.87 | 43.4 | 18.26 | 12.36 | 12.2 | 13.33 | 12.67 | 5.7 |
| ILMT | NO LM | 97M | 7.31 | 7.47 | 13.2 | 21.06 | 13.72 | 2.6 | 12.60 | 12.19 | 9.2 |
| | SHALLOW FUSION | 155M | 6.54 | 6.61 | 23.2 | 19.09 | 12.32 | 12.5 | 12.42 | 11.90 | 11.4 |
| | DENSITY RATIO | 212M | 4.28 | 4.85 | 43.7 | 18.30 | 12.23 | 13.1 | 12.23 | 11.85 | 11.8 |
| | ILME | 155M | 3.30 | 3.65 | 57.6 | 17.00 | 11.60 | 17.6 | 12.11 | 11.58 | 13.8 |

FIG. 4

| E2E MODEL | METHOD | PARAMS | $\lambda_T$ | $\mu$ | WER | | TEST WERR |
|---|---|---|---|---|---|---|---|
| | | | | | DEV | TEST | |
| RNN-T | BS | 76M | - | - | 20.03 | 20.23 | - |
| | SF | 134M | 0.07 | 0.00 | 18.37 | 18.88 | 6.7 |
| | DR | 191M | 0.20 | 0.12 | 16.14 | 18.07 | 10.7 |
| | ILME | 134M | 0.24 | 0.12 | 15.48 | 17.01 | 15.9 |
| AED | BS | 97M | - | - | 18.10 | 22.04 | - |
| | SF | 155M | 0.10 | 0.00 | 12.84 | 13.39 | 39.2 |
| | DR | 212M | 0.12 | 0.02 | 12.22 | 12.86 | 41.7 |
| | ILME | 155M | 0.13 | 0.10 | 11.72 | 12.31 | 44.1 |

FIG. 5

| E2E MODEL | METHOD | PARAMS | $\lambda_T$ | $\mu$ | MEETING | |
|---|---|---|---|---|---|---|
| | | | | | WER | WERR |
| RNN-T | BS | 76M | - | - | 20.64 | - |
| | SF | 134M | 0.02 | 0.00 | 20.47 | 0.8 |
| | DR | 191M | 0.03 | 0.02 | 20.60 | 0.2 |
| | ILME | 134M | 0.08 | 0.03 | 19.97 | 3.2 |
| AED | BS | 97M | - | - | 19.46 | - |
| | SF | 155M | 0.09 | 0.00 | 18.87 | 3.0 |
| | DR | 212M | 0.11 | 0.03 | 18.85 | 3.1 |
| | ILME | 155M | 0.12 | 0.08 | 18.25 | 6.2 |

FIG. 6

INTERNAL LANGUAGE MODEL FOR E2E MODELS

CROSS REFERENCE TO RELATED APPLICATIONS

This application claims priority to U.S. Provisional Patent Application Ser. No. 63/108,180, filed Oct. 30, 2020, the entirety of which is hereby incorporated herein by reference for all purposes.

BACKGROUND

External language model (LM) integration remains a challenging task for end-to-end (E2E) automatic speech recognition (ASR) which typically does not have a clear division between acoustic models and language models. E2E ASR, with the goal of directly mapping input speech features to output token sequences, has achieved state-of-the-art performance on a variety of tasks. However, incorporating acoustic model (AM), language model (LM), and pronunciation models in a single deep neural network (DNN) makes E2E models more susceptible to domain shift from training to testing than conventional DNN-hidden Markov model (HMM) hybrid models.

SUMMARY

A computer device is disclosed herein that comprises one or more processors configured to receive an end-to-end (E2E) model that has been trained for automatic speech recognition with training data from a source-domain, and receive an external language model that has been trained with training data from a target-domain. The one or more processors may be further configured to perform an inference of the probability of an output token sequence given a sequence of input speech features. Performing the inference may include computing an E2E model score for one or more candidate output token sequences based on the sequence of input speech features using the E2E model. Performing the inference may include computing an external language model score for the one or more candidate output token sequences using the external language model. Performing the inference may include computing an estimated internal language model score for the one or more candidate output token sequences for the E2E model. The E2E model encodes an intrinsic language model and an intrinsic acoustic model. The estimated internal language model score may be computed by removing a contribution of the intrinsic acoustic model. Performing the inference may include computing an integrated score for the one or more candidate output token sequences based at least on E2E model score, the external language model score, and the estimated internal language model score.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 shows a table for results of cross-domain and intra-domain evaluation of a source-domain recurrent neural network transducer (RNN-T) end-to-end model integrated with an external language model using several language model integration techniques, and being trained using a standard end-to-end model training process and an internal language model training process, for the computer system of FIG. 1.

FIG. 4 shows a table for results of cross-domain and intra-domain evaluation of a source-domain attention-based encoder decoder (AED) end-to-end model integrated with an external language model using several language model integration techniques, and being trained using a standard end-to-end model training process and an internal language model training process, for the computer system of FIG. 1.

FIG. 5 shows a table for results of a cross-domain evaluation of a source-domain model on target-domain test data for the language model integration techniques implemented by the computer system of FIG. 1, and the end-to-end model being trained using a standard end-to-end model training process.

FIG. 6 shows a table for results of an intra-domain evaluation of a source-domain E2E model on in-domain meeting test data for the language model integration technique implemented by the computer system of FIG. 1, the end-to-end model being trained using a standard end-to-end model training process.

DETAILED DESCRIPTION

LM integration is an approach to adapt or customize E2E models towards testing scenarios for both cross-domain and intra-domain applications. For cross-domain applications, an external LM trained with target-domain text-only data is integrated with a source-domain E2E model to improve the ASR on the target-domain test data. For intra-domain application, an external LM trained with a large amount multi-domain text is fused with a multi-conditional E2E model to improve the ASR on multiple in-domain test data. With orders of magnitude more text-only data available than E2E training transcripts, the external LM has the potential benefit to correct the hypotheses of E2E models given unseen styles of speech or long tails of phrases and words in the test utterances. However, LM integration may be difficult for E2E models because no explicit separation of AM and LM exists in E2E models.

One example technique for LM integration is Shallow Fusion, which is an approach involving taking a log-linear interpolation between the scores of the E2E model and a separately-trained LM during decoding. Other examples techniques for LM integration include Deep Fusion and Cold Fusion, which jointly train an E2E model with an external LM to learn a combination between their hidden units via gating mechanisms. However, Deep Fusion and Cold Fusion require additional training steps and incur additional computational costs during decoding.

Another example technique for LM integration includes the Density Ratio method which is an extension of Shallow Fusion. During inference, the score of a source-domain LM trained with E2E training transcript is subtracted from the log-linear combination of E2E model and external LM scores. Density Ratio has shown to consistently outperform Shallow Fusion in a cross-domain evaluation. However, Density Ratio is based on the assumption that the E2E posterior is factorizable into an acoustic model (AM) and an LM with individual parameters like a hybrid system, while the accurate factorization is to condition both the AM and LM components on the E2E model parameters. The token sequence probability predicted by an E2E model given no speech input is referred to herein as the "internal LM".

A hybrid autoregressive transducer (HAT) is another type of E2E model that preserves the modularity of the hybrid model. However, the HAT model includes a special network architecture that separately models the label and duration distributions.

Figure 1:
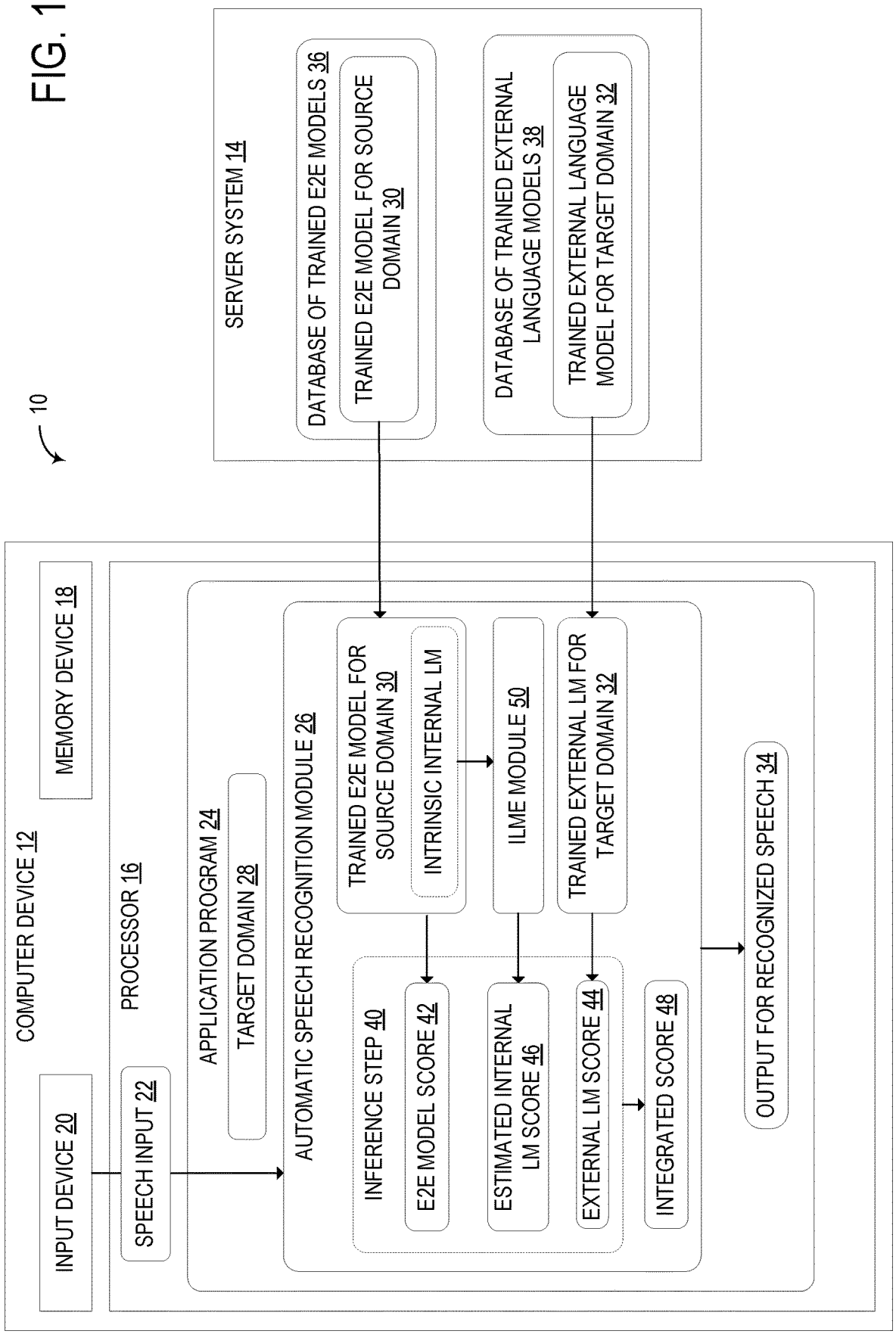
FIG. 1 shows a computer system that includes a computer device that implements language model integration techniques using an internal language model estimation method, according to one embodiment of the subject disclosure.

To address these issues, FIG. 1 illustrates a computer system 10 that implements an internal LM estimation (ILME) method to integrate external LMs with pre-existing E2E models. Several example pre-existing E2E models include connectionist temporal classification (CTC), recurrent neural network transducer (RNN-T), attention-based encoder-decoder (AED) models, and variants of these E2E models. However, it should be appreciated that the E2E models are not limited to these specific examples.

The ILME method described herein has the potential benefit of not requiring any additional model training. The ILME method, which will be described in more detail below, may be implemented with both time-synchronous recurrent neural network transducer (RNN-T) and time-asynchronous attention-based encoder-decoder (AED) models. However, it should be appreciated that the ILME method may also be implemented with other types of E2E models, and is not limited to the specific examples described herein.

The computer system 10 may includes a computer device 12 and a server system 141. The computer device 12 may be configured to communicate with the server system 14 over a computer network such as a wide area network (WAN). The computer device 12 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices. In one example, the computer device 12 may take the form of a thin client computer device where at least a portion of functions of the computer device 12 described herein are performed by the server system 14 that is communicating with the computer device 12.

The computer device 12 may include one or more processors 16, memory devices 18, input devices 20, and other suitable computer components. The memory devices 18 may include volatile and non-volatile storage devices. The input devices 20 may, for example, include a microphone input device configured to capture speech inputs 22 from a user of the computer device 12. The server system 14 may include one or more server devices. In one example, the server system 14 may include a plurality of server devices configured to operate in a cloud computing configuration.

The processor 16 of the computer device 12 may be configured to execute an application program 24 that implements an ASR module 26. In one example, the application program 24 may take the form of an email application program that includes a speech-to-text function that allows a user to dictate an email via the speech input 22. As another example, the application program 24 may take the form of a video conferencing software that allows multiple users to meet via audio communications. In this example, the video conferencing software may include an automatic transcription function that transcribes the audio communications from the meeting. It should be appreciated that the application program 24 is not limited to the examples described herein, but may take any suitable form of application program that implements an ASR function.

The ASR module is configured to receive the speech input 22 detected by the input device 20. The speech input 22 may be associated with a target domain 28 that may be determined based on the type of application program 24. For example, an email application program may be associated with an "email message" target domain. Each particular application program 24 may be associated with a target domain 28 that is applicable to the context of that application program 24. It should be appreciated that the types of words, grammar, sentence structure, and other language characteristics may differ between different domains. For example, the sentence structure and word choice used in emails may be different than those used in books.

As illustrated in FIG. 1, the ASR module 26 may be configured to evaluate a set of input data, such as the speech input 22, from the target domain 28 using a trained E2E model 30 implementing language model integration with the trained external language model 32 for the target domain 28. Implementations for the language model integration will be discussed in more detail below. The output 34 from the ASR module 26 may then be used by the application program 24 to perform a function, such as, for example, audio-to-text transcription, email dictation, etc.

As illustrated in FIG. 1, the server system 14 may be configured to store a database 36 of trained E2E models and a database 38 of trained external language models. The trained E2E models may, for example, take the form of an RNN-T model, an AED model, or another type of E2E model. These E2E models will now be described in detail.

An E2E model predicts the posterior distribution P(Y|X; $\theta_{E2E}$) over sequences of output tokens Y={$y_1, \ldots, y_U$} given a sequence of input speech features X={$x_1, \ldots, x_T$}, where $y_U \in V$, u=1, ..., U, and $x_T \in \mathbb{R}^{d_x}$, t=1, ... T. V is the set of all possible output tokens, e.g., word pieces, etc. For RNN-T and AED models, a special token $y_0$=<sos> is inserted at the beginning of Y to indicate the start of the sentence.

The RNN-T model consists of an encoder, a prediction network and a joint network. Analogous to an acoustic model, the encoder maps the input speech features to a sequence of hidden representations $H^{enc}$={$h_1^{enc}, \ldots, h_T^{enc}$}, i.e., $H^{enc}$=Encoder(X). Imitating an RNN-LM, the prediction network takes the embedding vector $e_{u-1}$ of the previous non-blank token $y_{u-1}$ to generate the hidden representation $h_u^{pred}$ by using an RNN, i.e., $h_u^{pred}$=PredicitionRNN($h_{u-1}^{pred}, e_{u-1}$).

RNN-T predicts a conditional distribution over blank-augmented token sequences $\tilde{Y}$={$\tilde{y}_1, \ldots \tilde{y}_{T+U}$}, where $\tilde{y}_i \in V \cup$<b>, i=1, ..., T+U, and <b> is a blank. $\tilde{Y}$ is aligned with the token and feature sequences Y and X as ($\tilde{y}_i, y_{u_i}, x_{t_i}$)$_{i=1}^{U+T}$, where the index i in $\tilde{Y}$ is mapped to the index $u_i$ in Y, and the index $t_i$ in X.

The joint network combines the outputs of the encoder and prediction network via a feed-forward network to produce the log its $z_{t_i,u_i}$, and applies a softmax to predict the conditional distribution over the next possible tokens in $V \cup \text{<b>}$, i.e., $$h_{t_i,u_i}^{joint} = \phi(W_e h_{t_i}^{enc} + W_p h_{u_i}^{pred} + b_e + b_p), \quad (1)$$

$$z_{t_i,u_i} = W_j h_{t_i,u_i}^{joint} + b_j, \quad (2)$$

$$[P(\tilde{y}_i = v | X_{1:t_i}, Y_{0:u_i-1}; \theta_{RNNT}^S)]_{v \in V \cup \text{<b>}} = \text{softmax}(z_{t_i,u_i}), \quad (3)$$

where $\phi$ is a non-linear function, e.g., tan h or ReLU. $W_e$ and $W_p$ are weight matrices, and $b_e$, $b_p$ are the biases. $z_{t_i,u_i}$ is a $|V|+1$ dimensional log it vector. $\tilde{y}_i$ forms a blank-augmented token sequence $\tilde{Y} = \{\tilde{y}_1, \ldots, \tilde{y}_{T+U}\}$ aligned with the token and feature sequences Y and X as $\{\tilde{y}_i, y_{u_i}, x_{t_i}\}_{i=1}^{U+T}$, i.e., the index i in $\tilde{Y}$ is mapped to the index $u_i$ in Y, and the index $t_i$ in X.

The RNN-T loss is computed by marginalizing over all possible blank-augmented token sequences aligned with each reference Y, i.e., A(X, Y), on the training corpus D.

$$\mathcal{L}_{RNN-T}(X,Y;\theta_{RNNT}) = -\Sigma_{(X,Y) \in D} \log \Sigma_{\tilde{Y} \in A(X,Y)} \Pi_{i=1}^{T+U} P(\tilde{y}_i | X_{1:t_i}, Y_{0:u_i-1}; \theta_{RNNT}). \quad (4)$$

The token sequence posterior $P(Y|X; \theta_{RNNT}^S)$ is computed by summing over the posteriors of all possible blank-augmented token sequences aligned with Y, i.e., A(X, Y).

$$P(Y | X; \theta_{RNNT}^S) = \sum_{\tilde{Y} \in A(X,Y)} P(\tilde{Y} | X; \theta_{RNNT}^S)$$

$$= \sum_{\tilde{Y} \in A(X,Y)} \prod_{i=1}^{T+U} P(\tilde{y}_i | X_{1:t_i}, Y_{0:u_i-1}; \theta_{RNNT}^S). \quad (5)$$

For AED, an $\langle \text{eos} \rangle$ token is added to the end of each token sequence to indicate the end of a sentence. The AED model incorporates an encoder, a decoder and an attention network. The encoder maps a sequence of input speech frames X into a sequence of hidden representations $H^{enc}$. The attention network determines which encoded features in $H^{enc}$ should be attended to predict the output label $y_u$ by generating an attention weight for each $h_t^{enc}$ at a decoder step u.

A context vector $c_u$ is computed as a linear combination of $H^{enc}$ weighted by the attention.

$$a_u = \text{AttentionNet}(a_{u-1}, h_t^{enc}, h_u^{dec}), \quad (6)$$

$$c_u = \Sigma_{t=1}^T a_{u,t} h_t^{enc}, \quad (7)$$

where $a_u$ is a vector of attention weights with a dimension of T.

At each step u, the decoder RNN takes the sum of the previous token embedding $e_{u-1}$ and the context vector $c_{u-1}$ as the input to predict the conditional distribution over $V \cup \langle \text{eos} \rangle$, i.e., $$h_u^{dec} = \text{DecoderRNN}(h_{u-1}^{dec}, e_{u-1} + c_{u-1}), \quad (8)$$

$$z_u = W_d h_u^{dec} + b_d, \quad (9)$$

$$[P(y_u = v | X, Y_{0:u-1}; \theta_{AED}^S)]_{v \in V \cup \langle \text{eos} \rangle} = \text{softmax}(z_u), \quad (10)$$

where $h_u^{dec}$ is the hidden state of the decoder RNN. $W_d$ and $b_d$ are weight matrix and bias, respectively.

The AED loss is obtained as a summation of token sequence posteriors over the training corpus D.

$$\mathcal{L}_{AED}(X,Y;\theta_{AED}) = -\Sigma_{(X,Y) \in D} \Sigma_{u=1}^{U+1} \log P(y_u | X, Y_{0:u-1}; \theta_{AED}) \quad (11)$$

The token sequence posterior $P(Y|X; \theta_{AED}^S)$ is computed as $$P(Y|X; \theta_{AED}^S) = \Pi_{u=1}^{U+1} P(y_u | X, Y_{0:u-1}; \theta_{AED}^S) \quad (12)$$

The E2E models may be trained for a variety of source domains and stored in the database 36 on the server system 14. As one example, the E2E models may be trained with thirty thousand (K) hours of anonymized and transcribed data from MICROSOFT services, including desktop and mobile voice search, short message dictation, command and control, and one-on-one and multi-party conversations, recorded in both close-talk and far-field conditions. However, it should be appreciated that the E2E models may be trained using any other suitable set of training data. The external LM models may be trained on large sets of text data form any suitable target domain 28.

As illustrated in FIG. 1, the ASR module 26 is configured to receive an E2E model 30 that has been trained for ASR with training data from a source domain. As discussed above, external language models have the potential benefit of correcting the hypotheses of E2E models given unseen styles of speech or long tails of phrases and words in the test utterances. Thus, the ASR module 26 is further configured to receive an external LM 32 that has been trained with training data from a target domain 28. The ASR module 26 may implement the following LM integration technique to achieve the potential benefits discussed above. In some examples, the E2E model 30 may be further trained using an internal LM training process that will be described in detail below.

The following is a high-level description of the example LM integration technique. To integrate the trained external LM 32 with the trained E2E model 30, the ASR module 26 may be configured to perform an inference of the probability of an output token sequence given a sequence of input speech features using the following steps at an inference step 40.

The ASR module 26 computes an E2E model score 42 for one or more candidate output token sequences based on the sequence of input speech features using the trained E2E model 30. A trained external LM for target domain 32 of the ASR module 26 computes an external language model score 44 for the one or more candidate output token sequences using the trained external language model 32. The internal language model estimation module 50 of ASR module 26 computes an estimated internal language model score 46 for the one or more candidate output token sequences for the E2E model 30. The E2E model 30 may encode an intrinsic language model and an intrinsic acoustic model. The estimated internal language model score is computed by removing a contribution of the intrinsic acoustic model.

Then, the ASR module 26 computes an integrated score 48 for the one or more candidate output token sequences based at least on E2E model score 42, the external language model score 44, and the estimated internal language model score 46. In one example, the integrated score for one or more candidate output token sequence is computed by subtracting the estimated internal language model score from a log-linear combination of the E2E model score and the external language model score.

The integrated score 48 may be used to determine the output 34 of the ASR module 26. The inference step 40 described above may take place during a beam search inference algorithm. Thus, the integrated score 48 may be estimated at each step of the beam search inference algorithm.

The process for estimating the internal language model score 46 may be different depending on the type of E2E model 30. In one example, the E2E model 30 may be an RNN-T. As will be described in greater detail below, the RNN-T model typically includes an encoder, a prediction network, and a joint network that combines an output of the encoder and an output of the prediction network via a feed-forward network. For the RNN-T model, the estimated internal language model score 46 may be computed by removing a contribution of the encoder of the RNN-T model to the feed-forward network.

In another example, the E2E model may be an AED model. As will be described in greater detail below, the AED model may include an encoder that maps sequence of input speech features into a sequence of hidden representations, an attention network that generates attention weights for encoded features in the sequence of hidden representations, a context vector that is computed as a linear combination of the sequence of hidden representations weighted by the attention weights, and a decoder that takes the context vector and a token sequence as input. For the AED model, the estimated internal language model score may be computed by removing a contribution of the encoder to the decoder of the AED model. In one example, the contribution of the encoder to the decoder may be removed by removing the context vector from the input to the decoder.

The internal language model estimation techniques discussed above will now be described in more detail.

The source-domain E2E posterior should be factorized as follows via Bayes' theorem $$P(Y \mid X; \theta_{E2E}^S) = \frac{P(X \mid Y; \theta_{E2E}^S) P(Y; \theta_{E2E}^S)}{P(X; \theta_{E2E}^S)}, \quad (13)$$

where all factors are conditioned on the same set of E2E parameters $\theta_{E2E}^S$, and $P(Y; \theta_{E2E}^S)$ is the internal LM of an E2E model. Given constant acoustic conditions, i.e., $P(X|Y; \theta_{E2E}^S) = P(X|Y; \theta_{AM}^T)$, the target-domain posterior is computed as follows.

$$P(Y \mid X; \theta_{E2E}^T) = P(Y \mid X; \theta_{E2E}^S) \frac{P(Y; \theta_{LM}^T) P(X; \theta_{E2E}^S)}{P(Y; \theta_{E2E}^S) P(X; \theta_{E2E}^T)} \quad (14)$$

During inference, the log probability of the internal LM is subtracted from the log-linear combination between the scores of E2E and external LMs as follow.

$$\hat{Y} = \underset{Y}{\operatorname{argmax}} \, [\log P(Y \mid X; \theta_{E2E}^S) + \lambda_T \log P(Y; \theta_{LM}^T) - \lambda_I \log P(Y; \theta_{E2E}^S)], \quad (15)$$

where $\lambda_I$ is internal LM weight. This LM integration method is referred to as the internal LM estimation (ILME). Compared to Density Ratio, ILME subtracts the log probability of an E2E internal LM parameterized by $\theta_{E2E}^S$ rather than that of a source-domain LM separately-trained with the training transcript of the E2E model.

The key step of ILME is to estimate the internal LM below defined as the token sequence probability distribution an E2E model implicitly learns from the audio-transcript training pairs $$P(Y; \theta_{E2E}^S) = \prod_{u=1}^{U+1} P(y_u \mid Y_{0:u-1}; \theta_{E2E}^S) \quad (16)$$

$$= \prod_{u=1}^{U+1} \prod_X P(y_u \mid X, Y_{0:u-1}; \theta_{E2E}^S) P(X \mid Y_{0:u-1}; \theta_{E2E}^S). \quad (17)$$

However, summation over the entire acoustical space in Eq. (17) may typically be difficult in practice. To address this, the internal LM may be approximate using an approach that will herein be referred to as the Joint Softmax Approximation (JSA).

According to the JSA approach, if $f_t$ is a high-level acoustic representation of the speech feature $x_t$, $g_u$ is a language representation of the token $y_u$, and the output probability of an E2E model can be expressed by $f_t$ and $g_u$ in the form of $P(y_u|X, Y_{0:u-1}; \theta_{E2E}^S) = \text{softmax}[J(f_t+g_u)]$, where J may take the form of any function that satisfies $J(f_t+g_u) \approx J(f_t) + J(g_u)$, the condition probability of the E2E internal LM, i.e., $P(y_u|Y_{0:u-1}; \theta_{E2E}^S)$, can be approximated as the output of the E2E model at the step u after zeroing out the acoustic representation $f_t$ from the network, i.e., softmax $[J(g_u)]$.

It should be appreciated that the JSA approach may provide the potential benefit of being able to be applied to estimate the internal LMs of the pre-existing E2E models, RNN-T and AED models, without any addition training.

With a softmax token distribution defined in Eq. (3), the joint network of RNN-T satisfies the conditions of JSA if Eqs. (1) and (2) are reformulated as $$f_{t_i} = W_e h_{t_i}^{enc} + b_e \quad (18)$$

$$g_{u_i} = W_p h_{u_i}^{pred} + b_p \quad (19)$$

$$z_{t_i, u_i} = J(f_{t_i} + g_{u_i}) \quad (20)$$

where $J(\bullet) = W_j \phi(\bullet) + b_j$ is a non-linear function followed by an affine transform. As linear transforms of encoder and prediction network outputs, $f_{t_i}$, $g_{u_i}$ are viewed as acoustic and language representations, respectively. According to the JSA approach, $f_{t_i}$ is zeroed and eliminated from the joint network. Thus, the log its are computed as follows $$z_u^{ILM} = J(g_u) = W_j \phi(W_p h_u^{pred} + b_p) + b_j \quad (21)$$

It should be appreciated that, without $f_{t_i}$, the RNN-T is completely driven by the prediction network with the token sequence Y (indexed by u) as the only input. Thus, no alignment exists between Y and X anymore, so the use of index i for the Eqs. (21) to (23) may be abandoned.

With a designated log it for the blank token $\langle b \rangle$, $z_u^{ILM}$ has a dimension of $|V|+1$. However, in order to estimate the internal LM of the non-blank token sequences Y, the approach described herein includes removing the blank log it from the vector $z_u^{ILM}$ to construct a new log it vector $z_u^{ILM,NB}$ of dimension $|V|$, and applying softmax over $z_{u_i}^{ILM,NB}$ to compute the internal LM conditional distribution over V| non-blank tokens below $$P(y_u|Y_{0:u-1}; \theta_{RNNT}^S) = \text{softmax}(z_{u_i}^{ILM,NB}) \quad (22)$$

With Eq. (16) and Eq. (22), the RNN-T internal LM is estimated as $$\log P_{ILM-RNNT}(Y) = \Sigma_{u=1}^{U} \log P(y_u|Y_{0:u-1}; \theta_{RNNT}^S) \quad (23)$$

In one specific example, the procedure of the ILME method for LM integration with RNN-T model is the following:

1. Train a standard RNN-T model with source-domain audio-transcript training pairs.
2. Train an external LM with target-domain text-only data.
3. During inference, at each step of the beam search, estimate an internal LM score of the next non-blank candidate token in V with Eq. (22), and subtract it from the log-linear interpolation between RNN-T and external LM scores of the same token given a partial hypothesis in the beam using Eq. (24). Use only the RNN-T score in Eq. (3) for the candidate token (b).

$$\text{Score}(\tilde{y}_{u_i}|X_{1:t_i},Y_{0:u_{i-1}})=\log P(\tilde{y}_i|X_{1:t_i},Y_{0:u_{i-1}};\theta_{RNNT}^S)+ \lambda_T \log P(\tilde{y}_i|Y_{0:u_{i-1}};\theta_{LM}^T)-\lambda_I \log P(\tilde{y}_{u_i}|Y_{0:u_{i-1}};\theta_{RNNT}^S) \quad (24)$$

The output distribution of AED is defined by a softmax function in Eq. (10). As a special case of JSA when t and u are synchronized (i.e., t=u), the decoder of AED also satisfies all its conditions once Eqs. (8) and (9) are reformulated as $$f_u = c_{u-1}, \quad (25)$$

$$g_u = e_{u=1}, \quad (26)$$

$$z_u = J(f_u + g_u) \quad (27)$$

where $J(\bullet) = W_d \text{DecoderRNN}(h_{u-1}^{dec}, \bullet) + b_d$ is a series of linear and non-linear functions. In this approach, $f_u$, a linear combination of encoder output, is used as the acoustic representation, and $g_u$, the token embedding, is used as the language representation.

Using the JSA approach, $f_u$, i.e., the context vector $c_u$, is removed from the decoder, and the conditional probability of the AED internal LM is computed by applying a softmax over log its output as follows $$P(y_u | Y_{0:u-1}; \theta_{AED}^S) = \text{softmax}[J(g_u)] \quad (28)$$
$$= \text{softmax}[W_d \cdot DecoderRNN(h_{u-1}^{dec}, e_{u-1}) + b_d]$$

It should be appreciated that, without $f_{t_i}$, AED is entirely driven by the decoder with the token sequence Y as the only input, acting like an RNN-LM. With Eq. (14) and Eq. (28), the AED internal LM is estimated as $$\log P_{ILM-AED}(Y) = \Sigma_{u=1}^{U+1} \log P(y_u|Y_{0:u-1};\theta_{AED}^S) \quad (29)$$

The procedure of the ILME method for LM integration with AED model is the following:

1. Train a standardAED model with the source-domain audio-transcript training pairs.
2. Train an external LM with target-domain text-only data.
3. During inference, at each step of the beam search, estimate an internal LM score of the next candidate token in V with Eq. (28), and subtract it from the log-linear interpolation between AED and external LM scores of the same token given a partial hypothesis in the beam using Eq. (30).

$$\text{Score}(y_u|X,Y_{0:u_{i-1}})=\log P(y_u|X,Y_{0:u_{i-1}};\theta_{AED}^S)+\lambda_T \log P(y_u|Y_{0:u_{i-1}};\theta_{LM}^T)-\lambda_I \log P(y_u|Y_{0:u_{i-1}};\theta_{AED}^S) \quad (30)$$

Figure 2:
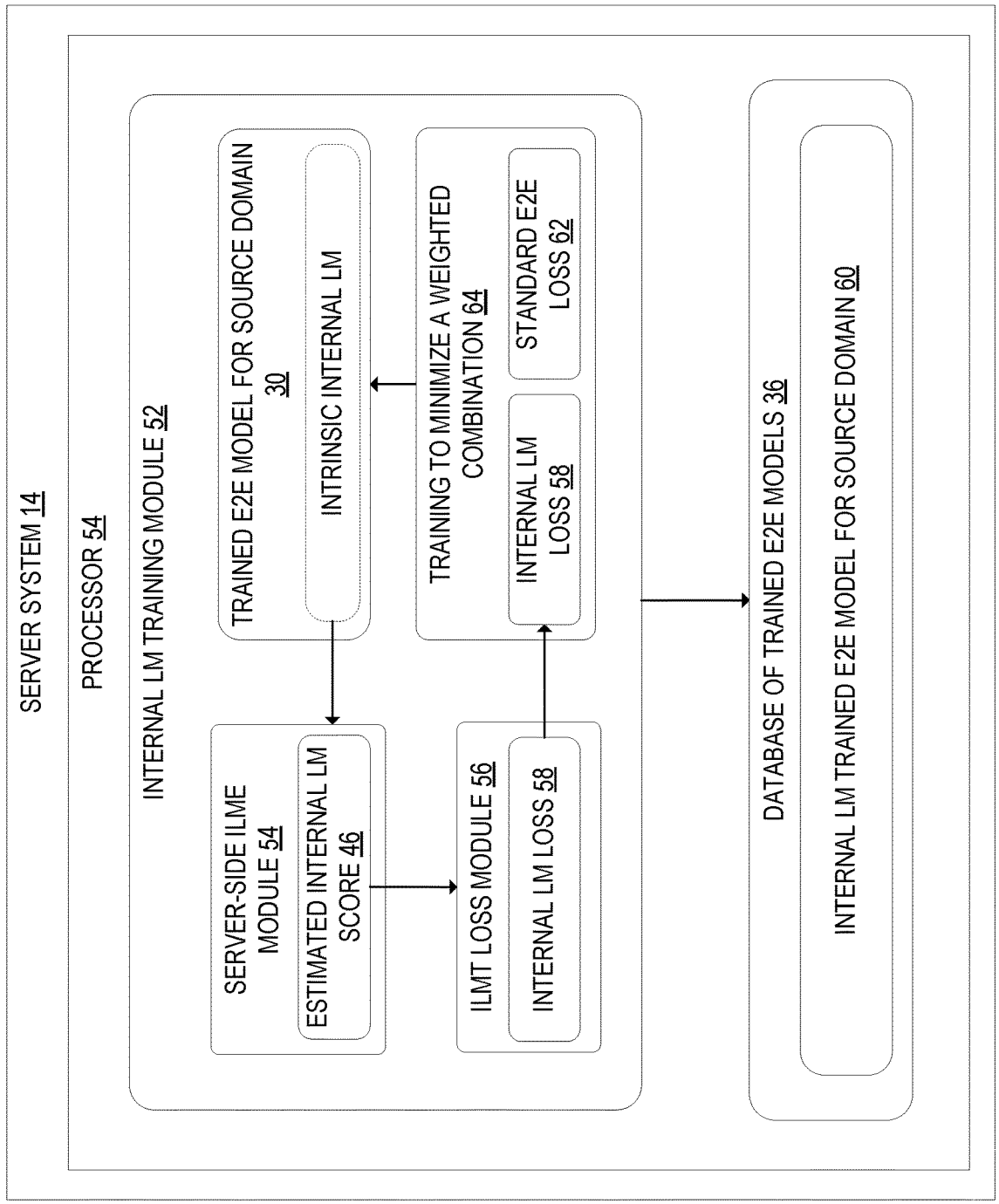
FIG. 2 shows a server system that implements an internal language model training technique for training an end-to-end model for the computer system of FIG. 1.

FIG. 2 illustrates an example server system 14 of the computer system 10 that implements an internal LM training module 52. The server system 14 includes one or more processors 54 and suitable computer components. As discussed above, in conventional E2E model training, an internal LM is implicitly learned to minimize the E2E loss by updating all parameters of the E2E model. However, during ILME-based inference, only a part of the E2E model contributes to the prediction of the internal LM score. The internal LM training module 52 may be configured to perform internal LM training on the E2E models 30 stored in the database 36. The internal LM training process may provide the potential benefit of mitigating a potential mismatch between the E2E training and the ILME-based inference.

Through conventional E2E training, the decoder of an AED or the prediction and joint networks of an RNN-T act as an acoustically-conditioned LM that takes both the token and acoustic embeddings as the input to predict the conditional probability of the next token. From Eqs. (22) and (28), the internal LM scores are estimated entirely by the acoustically-conditioned LM of an E2E model during ILME-based inference. Therefore, the internal LM training module 52 is configured to train E2E models such that the acoustically-conditioned LM of an E2E model also behaves like a standalone internal LM, without sacrificing ASR accuracy. The internal LM training module 52 is configured to jointly minimize an internal LM loss together with the standard E2E loss during internal LM training.

As shown in FIG. 2, the internal LM training module 52 includes a server-side internal LM estimation module 54 and an internal LM training loss module 56. The internal LM estimation module 54 is configured to perform similar functions as the ILME module 50 of FIG. 1 to determine estimated internal LM scores 46 for an E2E model 30. As will be discussed in more detail below, the internal LM training loss module 56 is configured to compute an internal LM loss 58 based at least in part on the estimated internal LM scores 46. The internal LM loss 58 and a standard E2E loss 62 may then be used to perform internal LM training on the E2E model 30 by training the E2E model to minimize a weighted combination of the internal LM loss 58 and the standard E2E loss 62, such that the acoustically-conditioned intrinsic internal LM of the E2E model 30 also behaves like a standalone internal LM, without sacrificing ASR accuracy. After the internal LM training, the internal LM trained E2E model 60 may be stored in the database of trained E2E models 36 on the server system 14, and sent to the computer device 12 as described above.

The internal LM loss of an RNN-T model is obtained by summing up the negative log probabilities of the internal LM over the training corpus D as follows $$\mathcal{L}_{ILM}(X,Y;\theta_{pred},\theta_{joint})=\Sigma_{Y\in D}\Sigma_{u=1}^{U} \log P(y_u|Y_{0:u-1};\theta_{pred},\theta_{joint}). \quad (31)$$

From Eqs. (21) and (22), the RNN-T internal LM loss is conditioned only on the parameters of the prediction and joint networks, $\theta_{pred}$ and $\theta_{joint}$. For RNN-T, the internal LM training loss is constructed as a weighted sum of the RNN-T loss in Eq. (4) and the internal LM loss below $$\mathcal{L}_{ILMT}(X,Y;\theta_{RNN-T})=\mathcal{L}_{RNN-T}(X,Y;\theta_{RNN-T})+\alpha\mathcal{L}_{ILM}(X,Y;\theta_{pred},\theta_{joint}), \quad (32)$$

where $\alpha$ is the weight of the internal LM loss. By minimizing the RNN-T internal LM training loss, the internal LM probability of the E2E training transcripts is maximized by updating only the prediction and joint networks while maximizing the conditional probability of the training transcripts given input speech by updating the entire RNN-T.

The internal LM loss of AED is formulated as a summation of negative log probabilities of the internal LM over training corpus D $$\mathcal{L}_{ILM}(X,Y;\theta_{dec}) = -\Sigma_{Y \in D} \Sigma_{u=1}^{U+1} \log P(y_u|Y_{0:u-1};\theta_{dec}) \quad (33)$$

From Eq. (28), the AED internal LM loss is conditioned only on the parameters of the decoder $\theta_{dec}$. For AED, the internal LM training loss is computed as a weighted sum of the AED loss and the internal LM loss below $$\mathcal{L}_{ILMT}(X,Y;\theta_{AED}) = \mathcal{L}_{AED}(X,Y;\theta_{AED}) + \alpha \mathcal{L}_{ILM}(X,Y;\theta_{dec}), \quad (34)$$

By minimizing the AED internal LM training loess, the internal LM probability of the E2E training transcripts is maximized by updating only the AED decoder while maximizing the conditional probability of the training transcripts given input speech by updating the entire AED model.

The computer device 12 and the server system 14 of FIG. 1 may be configured to implement an internal LM training procedure with ILME-based inference for the LM integration with an E2E model as follows.

1. Train an E2E model with source-domain audio-transcript pairs to minimize the internal LM training loss in Eq. (32) for RNN-T or in Eq. (34) for AED E2E models.

2. Train an external LM with target-domain text-only data.

3. Integrate the internal LM trained E2E model in Step 1 with the external LM in Step 2 by performing ILME-based inference discussed above with reference to FIG. 1.

Using this procedure, a standalone intrinsic internal LM with a significantly lower perplexity is learned only by the E2E model components used to compute the intrinsic internal LM scores during the ILME-based inference. This procedure provides the potential benefit of increased modularity such that the E2E model is more adaptable to the target domain with increased flexibility to minimize the effect of the source-domain internal LM through the ILME-based inference. It should be appreciated that the internal LM training procedure is not required for performing the ILME-based inference techniques described above with reference to FIG. 1. However, training an E2E model using the internal LM training procedure before performing ILME-based interference may provide potential benefits that facilitate an improved LM integration, and thus an improved ASR performance on target-domain data.

FIGS. 3-7 illustrate experimental results that show the potential benefits of the ILME and internal LM training techniques described above. The results for both cross-domain and intra-domain evaluations with different LM integration methods will now be shown. For all of the evaluations shown below, beam search inference is performed with a beam size of 25. All E2E models and RNN-LMs predict word-piece output tokens. For these evaluations, 3999 word pieces were generated as the token vocabulary V by running byte-pair encoding on acoustic training text, and tokenizing all the training transcripts of E2E models and the training text of LMs with these word pieces.

The RNN-T and an AED are trained using the internal LM training procedure described herein with the same thirty thousand (K) hours of anonymized and transcribed data from MICROSOFT services, including desktop and mobile voice search, short message dictation, command and control, and one-on-one and multi-party conversations, recorded in both close-talk and far-field conditions. Eighty-dimensional log Mel filter bank features are extracted from the speech signal in both the training and test sets every ten milliseconds over a twenty-five milliseconds window. Three consecutive frames are stacked, and the stacked frame are strided by thirty milliseconds, to form a sequence of two hundred and forty-dimensional input speech features.

A 30K-hour RNN-T model is trained predicting word pieces for E2E ASR. The encoder is a uni-directional long short-term memory (LSTM) with six hidden layers, each with 1024 hidden units. Each word-piece is represented by a 1024-dimensional embedding vector. The prediction network is a uni-directional LSTM with two hidden layers, each with 1024 hidden units. The outputs of the encoder and the prediction network are projected to 1024-dimensional vectors after layer normalization. The joint network has 4000-dimensional output units predicting 3999 word pieces and ⟨b⟩. Dropout with a probability of 0.1 is used in both the encoder and the prediction network. An RNN-T loss is implemented with a memory-efficient forward-backward algorithm and is minimized during training. The RNN-T model has 76 M parameters.

During internal LM training, the weight of the internal LM loss is set to 0.4. The internal LM perplexities of the internal LM trained RNN-T model and the standard RNN-T model in are 52.0 and 99.4, respectively, on the validation set of 30K-hour data.

A 30K-hour AED model is trained predicting word pieces for E2E ASR. The encoder is a bi-directional LSTM with six hidden layers and 780 hidden units in each layer. The hidden vectors from both directions are concatenated at each layer and projected to a 780-dimensional vector before layer normalization. Each word-piece is represented by a 780-dimensional embedding vector. The decoder is a uni-directional LSTM with two hidden layers, each with 1280 hidden units. The decoder has 4000-dimensional output units predicting 3999 word pieces and ⟨eos⟩. During training, scheduled sampling is applied to the decoder at rate of 0.0001. Dropout with a probability of 0.1 is used in both the encoder and the decoder. A label-smoothed cross-entropy loss is minimized during training. The AED model has 97 M parameters.

During internal LM training, the weight of the internal LM loss is set to 1.0. The internal LM perplexities of the internal LM trained AED model and the standard AED model in are 46.1 and 796.7, respectively, on the validation set of the 30K-hour training data.

For the cross-domain evaluation, a source-domain E2E model on target-domain test data is evaluated by integrating an external LM trained with the text-only data in the target domain. The RNN-T or AED model trained with 30K-hour multi-condition data is used as the source-domain E2E model. LibriSpeech data, which includes read English speech based on LibriVox's audio books, is defined as the target domain. The LibriSpeech corpus consists of 960 hours of transcribed training speech and additional 813 M words of text-only data collected from 14.5K books. It should be appreciated that the source-domain 30K-hour training data includes neither the LibriSpeech data nor any read speech from public books. The short message dictation in the 30K-hour data has a very different style from audio books.

A target-domain word-piece LSTM-LM is trained with a combination of the 9.4 M-word transcript of the 960-hour training speech and the 813 M-word text in LibriSpeech. The LSTM-LM has two hidden layers with 2048 hidden units for each layer. The top hidden layer is first projected to a 512-dimensional embedding, and is then mapped to 4000 output units predicting 3999 word pieces and ⟨eos⟩. Each token is represented by a 512-dimensional embedding. The parameters of input and output embeddings are tied. The LSTM-LM is trained using noise-contrastive estimation loss. The LibriSpeech LSTM-LM has 58 M parameters in total. For the Density Ratio (DR) technique, a source-domain word-piece LSTM-LM is trained with two hidden layers and 2048 hidden units at each layer using the 271 M-word transcript of the 30K data. The source-domain LM consists of 57 M parameters.

The results for an RNN-T model are shown in FIG. 3 for both an RNN-T model that has been trained using internal LM training (ILMT) and an RNNT-T model that has been trained using standard E2E training. The 30K-hour E2E models are evaluated on a target-domain test set, LibriSpeech "test-clean" with 53K words by using LibriSpeech "dev-clean" with 54K words as the validation set for tuning the LM weights. All three LM integration methods show relative WER reductions in the range of 16.1%-29.1% from the baseline RNN-T. The ILME technique of the present disclosure performs the best achieving 15.5% and 5.6% relative WER reductions compared to Shallow Fusion and Density Ratio, respectively. With ILMT, all three LM integration methods show 27.9%-40.9% relative WER reductions from the baseline with standard RNN-T training and inference, significantly larger than the corresponding reductions without ILMT in the range of 16.1%-29.1%. ILMT with ILME inference performs the best achieving 29.6% and 16.6% relative WER reductions from the standard RNN-T with Shallow Fusion and ILME inference, respectively.

The results for an AED model are shown in FIG. 4 for both an AED model that has been trained using ILMT and an AED model that has been trained using standard E2E training. The results for AED are similar to that of RNN-T with ILME showing improved performance, achieving 43.4%, 8.6% and 4.3% relative WER reductions from AED baseline, Shallow Fusion and Density Ratio, respectively. Additionally, ILMT with ILME-based inference also shows improved performance, achieving 57.6%, 31.5% and 25.1% relative WER reductions from the standard AED training with AED inference, Shallow Fusion and ILME inference, respectively.

Then, the 30K-hour E2E models are evaluated on another target-domain test set, LibriSpeech "test-other" with 52K words by using LibriSpeech "dev-other" with 51K words as the validation set. The results are shown in FIG. 5. All three LM integration methods show WER reductions in the range of 6.7%-15.9% relative to the baseline RNN-T. ILME shows improved performance, achieving 9.9% and 5.9% relative WER reductions compared to Shallow fusion and Density ratio, respectively. The results for AED are similar to that of RNN-T with ILME showing improved performance, achieving 44.1%, 8.1%, and 4.3% relative WER reductions from AED baseline, Shallow Fusion and Density Ratio, respectively.

For the intra-domain evaluation, a multi-conditional E2E model is evaluated on intra-domain test data by integrating a strong external LM trained with a large amount of multi-domain text-only data. The 30K-hour multi-conditional RNN-T or AED model discussed above is used for the evaluation. A strong multi-domain word-piece LSTM-LM is trained on a 2B-word text corpus, consisting primarily of conversational data such as, for example, talks, interviews, and meeting transcripts. The text corpus is further augmented with anonymized data from relevant MICROSOFT services such as, for example, short message dictation. With a size of 58 M parameters, the 2B-word LSTM-LM has 2 hidden layers with 2048 units for each layer. For Density Ratio, the same source-domain LSTM-LM discussed above is used.

In an in-domain in-house dictation evaluation, the 30K-hour E2E models are evaluated on the in-domain inhouse dictation test set. With 15K words in total, the in-house dictation test set consists of dictation speech collected from keyboard voice input. The in-house dictation test set has a similar style as the dictation data in 30K corpus and is thus considered as in-domain test data. Email dictation data with 9K words is used as the validation set for tuning the LM weights. The results for an RNN-T model are shown in FIG. 3 for both an RNN-T model that has been trained using ILMT and an RNNT-T model that has been trained using standard E2E training.

For the RNN-T model that has been trained using standard E2E training, all three LM integration methods show relative WER reductions in the range of 2.4%-9.0% from the baseline RNN-T. ILME shows improved performance achieving 6.8% and 6.0% relative WER reductions compared to Shallow Fusion and Density Ratio, respectively.

For the RNN-T model that have been trained using ILMT, all three LM integration methods show 6.9%-13.6% relative WER reductions from the baseline with standard RNN-T training and inference, significantly larger than the corresponding reductions without ILMT in the range of 2.4%-9.0%. ILMT with ILME inference shows improved performance, achieving 11.4% and 5.0% relative WER reduction from the standard RNN-T training with Shallow Fusion and ILME inference, respectively.

The results for an AED model are shown in FIG. 4 for both an AED model that has been trained using ILMT and an AED model that has been trained using standard E2E training. For the AED model that has been trained using standard E2E training, all three LM integration methods show relative WER reductions in the range of 8.0%-12.2% from the baseline AED. ILME shows improved performance relative to both Shallow Fusion and Density Ratio. For the AED model that been trained using ILMT, ILMT with ILME-based inference shows further improved performance, achieving 17.6%, 10.5% and 6.1% relative WER reductions from the standard AED training with AED inference, Shallow Fusion and ILME inference, respectively.

For an in-house conversation data test, a 30K-hour E2E model is evaluated on an in-house conversation test set by integrating a strong multi-domain external LSTM-LM. From the MICROSOFT telecommunication applications, 2560 in-house conversational utterances were collected as the test set, and another 1280 conversational utterances were collected as the validation set. The test set has a similar style as the conversational data in 30K-hour corpus and is thus considered as in-domain evaluation.

As shown in FIG. 3, with ILMT RNN-T, all three LM integration methods show 6.8%-9.1% relative WER reductions from the baseline with standard RNN-T training and inference, significantly larger than the corresponding reductions without ILMT in the range of 0.4%-1.6%. ILMT with ILME inference shows improved performance, achieving 8.0% and 7.6% relative WER reductions from the standard RNNT training with Shallow Fusion and ILME inference, respectively.

As shown in FIG. 4, the AED results are similar to RNN-T. ILMT with ILME inference shows improved performance, achieving 13.8%, 10.6% and 8.6% relative WER reductions from the standard AED training with AED inference, Shallow Fusion and ILME inference, respectively.

As summarized in FIG. 6, the 30K-hour E2E models are evaluated on an in-domain in-house meeting test set. With 5K words in total, in-house meeting set consists of conversation speech collected from real meetings. The in-house meeting set has a similar style as the conversation data in 30K-hour corpus, and is thus considered as in-domain test data. Simulated meeting data with 22K words consisting of read meeting transcriptions is used as the validation set. The results are shown in FIG. 6. All three LM integration methods show WER reductions in the range of 0.2%-3.2% relative to the baseline RNN-T. ILME performs the best achieving 2.4% and 3.1% relative WER reductions compared to Shallow Fusion and Density Ratio, respectively. The results for AED are similar to that of RNN-T with ILME performing the best, achieving 6.2%, 3.3% and 3.2% relative WER reductions from AED baseline, Shallow Fusion and Density Ratio, respectively.

The following observations may be made for the above tests sets in both cross-domain and intra-domain evaluations. For both E2E models, ILME consistently reduces the WER of Shallow Fusion by 8.1%-15.5% relatively in cross-domain evaluation, and 2.4%-6.8% relatively in intra-domain evaluation. ILME also consistently outperforms Density Ratio in terms of lower WER, and achieves the goal with 29.8% and 26.8% fewer run-time parameters with RNN-T and AED, respectively, because ILME does not require an additional source-domain LSTM-LM during beam search.

Additionally, the baseline WER for AED is lower than RNN-T because AED has a bi-directional encoder and has more parameters than RNN-T. With larger relative WER reductions from the AED baseline, all LM integration methods are more effective for AED than for RNN-T. However, the potential benefits provided by subtracting internal LM is larger for RNN-T than for AED because ILME gets greater relative WER reductions with RNN-T than with AED from Shallow Fusion. Further, for all three LM integration methods, most of the gains those methods obtain are transferable from the dev sets to the test sets with both E2E models, showing that they all have good generalization capability.

By comparing cross-domain and intra-domain evaluations, it should be appreciated that all LM integration methods obtain much higher relative WER reductions from the baseline E2E model in cross-domain evaluation (LibriSpeech test-clean, test-other sets) than in intra-domain evaluation (in-house dictation, in-house meeting). This may be caused because in intra-domain evaluation, the E2E training data has been exposed to data with similar language styles as in testing, diminishing the effectiveness of an external LM. However, on in-domain test data, the ILME method described herein may provide the potential benefits of a 3.2%-9.0% relative WER reductions from the baseline RNN-T, which is significantly larger than the 0.2%-3.2% relative WER reductions obtained by Shallow Fusion and Density Ratio. This shows that the subtraction of internal LM indeed enables a more effective integration of the external LM, and thus provides the potential benefit of a better use of the abundant external knowledge from text-only data.

Additionally, from the results of FIGS. 3 and 4, the following observations may be made for both RNNT and AED models, and for both cross- and intra-domain evaluations. All LM integration methods consistently achieve lower WERs with ILMT than with standard E2E training. Among all methods, ILMT with ILME inference consistently shows improved performance, with 29.6%-31.5% and 8.0%-11.4% relative WER reductions from standard E2E training with Shallow Fusion for cross-domain and intra-domain evaluations, respectively. ILME inference consistently outperforms Density Ratio in terms of WER with ILMT or standard E2E training despite having 26.8%-29.8% fewer model parameters. All of these manifest the potential benefits of ILMT over standard E2E training for ILME inference and other LM integration methods.

Figure 7:
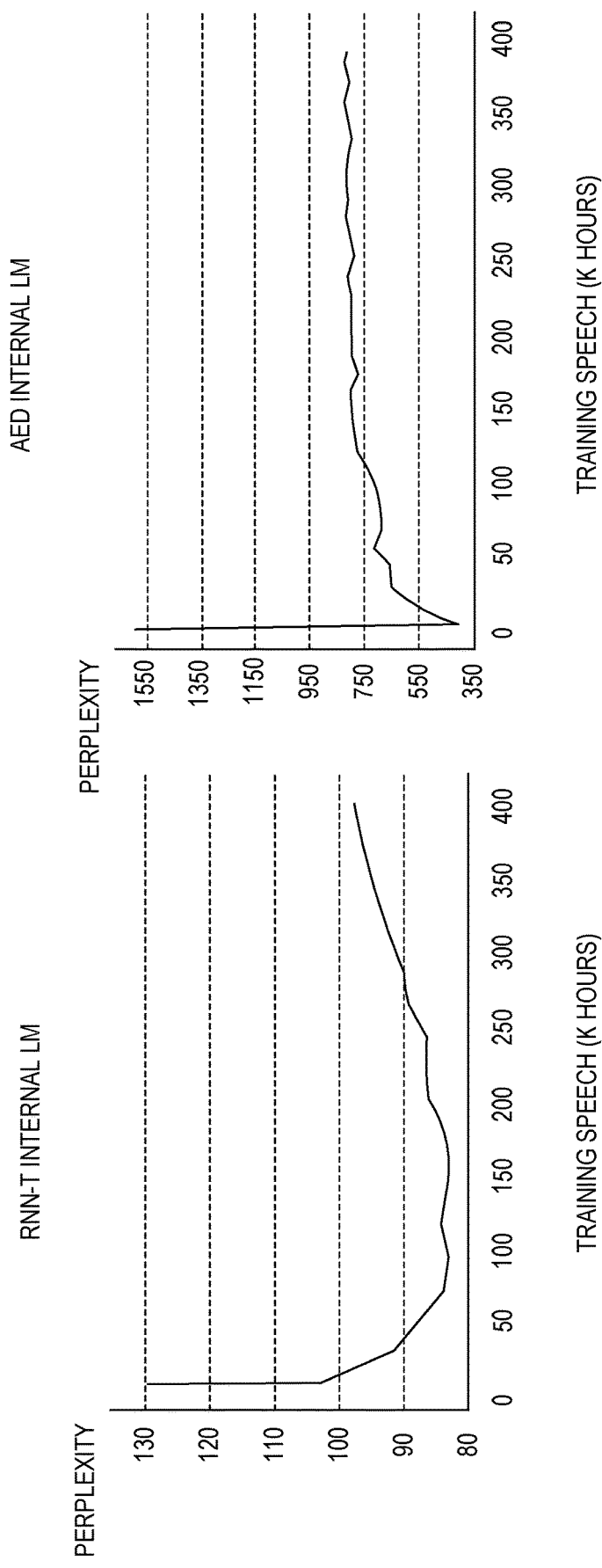
FIG. 7 shows a graph for a perplexity evaluation of the internal language models of two source-domain end-to-end models on a validation set of end-to-end model training.

The internal LM perplexities (ILM-PPLs) of AED and RNN-T models at different epochs are evaluated on the validation set of 30K-hour training data which is drawn from the same distribution as the training data. In FIG. 7 both ILM-PPLs first decrease and then increase as the E2E models get trained with more data. Both ILM-PPLs fall sharply at initial epochs, but the one of AED begins to increase and then gradually converge at much earlier training stages than that of RNN-T. The significantly larger ILM-PPL of AED than RNN-T suggests that in AED, the decoder needs to work together with the encoder to perform the language modeling. The decoder does not function well as a standalone LM without the encoder input. However, in RNN-T, the prediction network is trained to act like an individual LM and is later combined with the encoder by the joint network.

The ILM-PPLs of the RNN-T and LAS described above and are 99.4 and 796.7, respectively, while the source-domain LM trained with 30K-hour training transcript has a PPL of 30.1 on the same data. Given the maximum perplexity of 4000 under uniform distribution over tokens, the internal LM is shown to learn, to some extent, the distribution of token sequences through the E2E training.

As discussed above, the internal LM perplexities of the internal LM trained RNN-T model and the standard RNN-T model are 52.0 and 99.4, respectively, on the validation set of 30K-hour data. The internal LM perplexities of the internal LM trained AED model and the standard AED model in are 46.1 and 796.7, respectively, on the validation set of the 30K-hour training data.

Figure 8:
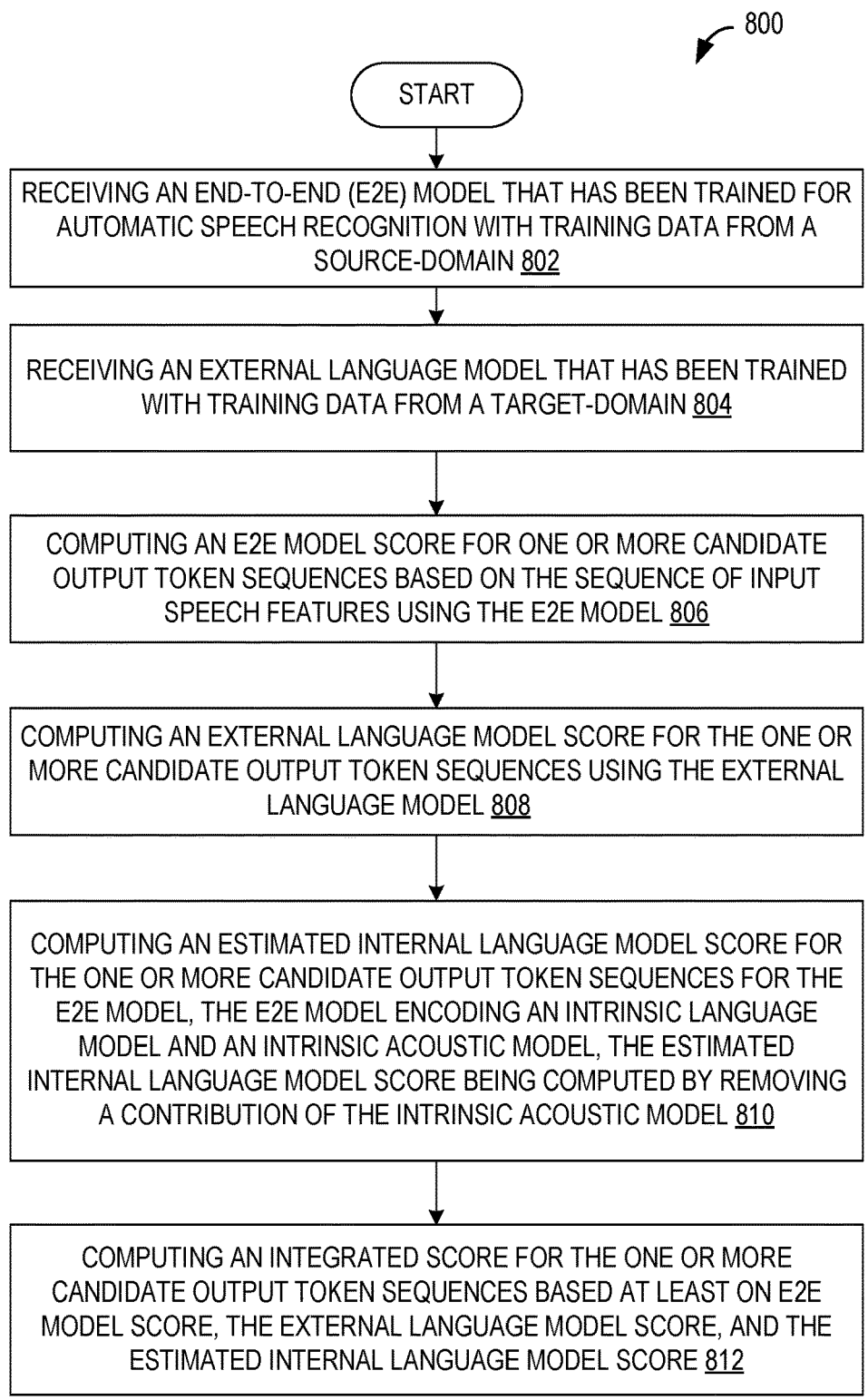
FIG. 8 shows a flowchart of an example method for implementing internal language model estimation for end-to-end models for automatic speech recognition, according to one embodiment of the subject disclosure.

FIG. 8 shows a flowchart for an example method 800 for implementing internal LM estimation for E2E models for ASR. The following description of method 800 is provided with reference to the software and hardware components described above and shown in FIG. 1. It should be appreciated that the method 800 also can be performed in other contexts using other suitable hardware and software components.

At 802, the method 800 may include receiving an end-to-end (E2E) model that has been trained for automatic speech recognition with training data from a source-domain. The E2E model may take the form of an RNN-T model that includes an encoder, a prediction network, and a joint network that combines an output of the encoder and an output of the prediction network via a feed-forward network. In another example, the E2E model may take the form of an AED model that includes an encoder that maps sequence of input speech features into a sequence of hidden representations, an attention network that generates attention weights for encoded features in the sequence of hidden representations, a context vector that is computed as a linear combination of the sequence of hidden representations weighted by the attention weights, and an encoder that takes the context vector and a token sequence as input.

In one example, the E2E model has been trained to jointly minimize an internal language model loss and an E2E model loss. In this example, the internal language model loss may be determined based on summing negative log probabilities of the intrinsic language model over a training corpus. Implementing ILMT for the E2E models provides the potential benefit of achieving lower WERs compared to E2E models that have been trained with standard E2E training. Additionally, ILMT with ILME inference consistently shows improved performance, with 29.6%-31.5% and 8.0%-11.4% relative WER reductions from standard E2E training with Shallow Fusion for cross-domain and intra-domain evaluations, respectively. ILME inference consistently outperforms Density Ratio in terms of WER with ILMT or standard E2E training despite having 26.8%-29.8% fewer model parameters.

At 804, the method 800 may include receiving an external language model that has been trained with training data from a target-domain. The external language model may be received from a server system that includes a database of different external language models. As discussed above, external language models have the potential benefit of correcting the hypotheses of E2E models given unseen styles of speech or long tails of phrases and words in the test utterances.

The method 800 includes performing an inference of the probability of an output token sequence given a sequence of input speech features by performing steps 806-812.

At 806, the method 800 may include computing an E2E model score for one or more candidate output token sequences based on the sequence of input speech features using the E2E model.

At 808, the method 800 may include computing an external language model score for the one or more candidate output token sequences using the external language model.

At 810, the method 800 may include computing an estimated internal language model score for the one or more candidate output token sequences for the E2E model, the E2E model encoding an intrinsic language model and an intrinsic acoustic model, the estimated internal language model score being computed by removing a contribution of the intrinsic acoustic model.

If the E2E model is an RNN-T model, the estimated internal language model score for the RNN-T model may be computed by removing a contribution of the encoder of the RNN-T model to the feed-forward network. If the E2E model is an AED model, the estimated internal language model score for the AED model may be computed by removing a contribution of the context vector to the decoder of the AED model.

At 812, the method 800 may include computing an integrated score for the one or more candidate output token sequences based at least on E2E model score, the external language model score, and the estimated internal language model score. In one example, the integrated score for one or more candidate output token sequence is computed by subtracting the estimated internal language model score from a log-linear combination of the E2E model score and the external language model score. The integrated score may be estimated at each step of a beam search inference algorithm.

The systems and processes described herein provide an ILME and ILMT method that provides the potential benefit of improved integration of the external LM with pre-existing E2E models. The ILME technique described herein may provide these potential benefits without requiring additional model training. As shown in FIGS. 3 and 4, performing the additional training procedure of ILMT described above may further enhance the potential benefits provided by ILME-based inference. It should be appreciated that the ILMT procedure may also be used to provide the potential benefit of improved integration of external LMs for other integration techniques, such as Shallow Fusion and Density Ratio. The described ILME and ILMT techniques provide these potential benefits for both the RNN-T and AED models. The ILME technique can provide the potential benefits of alleviating the domain mismatch between training and testing, and improving the multi-domain E2E ASR.

These potential benefits are illustrated in FIGS. 3-7, which show that several LM integration methods consistently achieve lower WERs with ILMT than with standard E2E training. Further, ILMT with ILME inference consistently shows improved performance, with 29.6%-31.5% and 8.0%-11.4% relative WER reductions from standard E2E training with Shallow Fusion for cross-domain and intra-domain evaluations, respectively. ILME inference consistently outperforms Density Ratio in terms of WER with ILMT or standard E2E training despite having 26.8%-29.8% fewer model parameters. All of these manifest the potential benefits of ILMT over standard E2E training for ILME inference and other LM integration methods.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
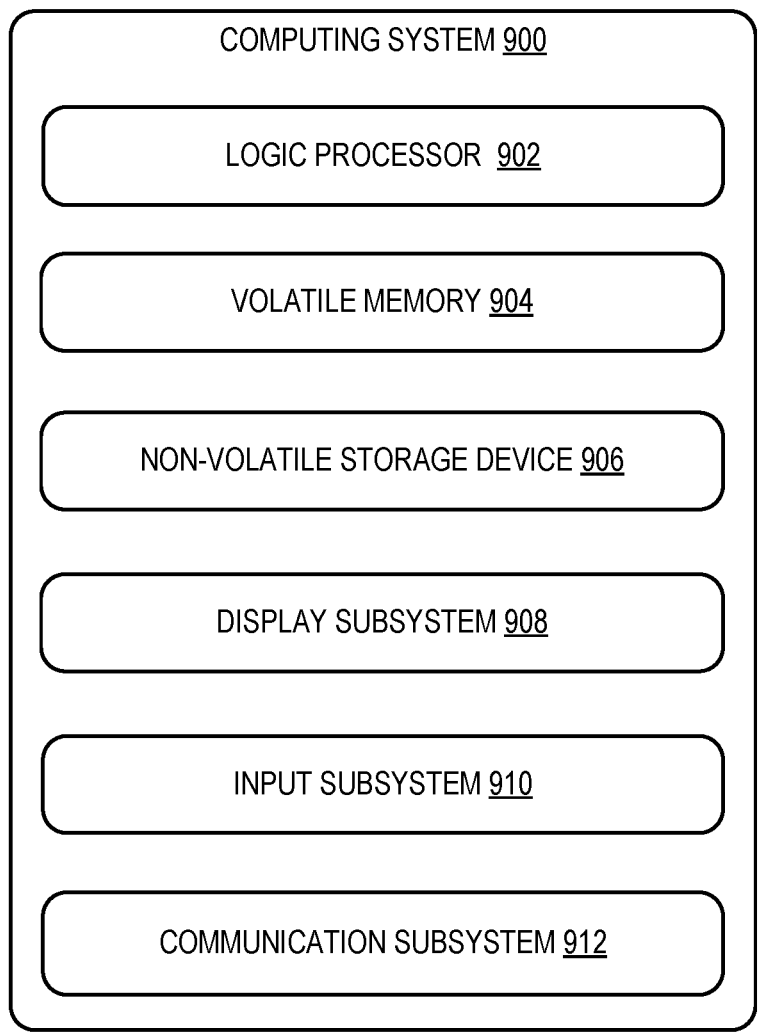
FIG. 9 shows a schematic view of an example computing environment in which the computer system of FIG. 1 may be enacted.

FIG. 9 schematically shows a non-limiting embodiment of a computing system 900 that can enact one or more of the methods and processes described above. Computing system 900 is shown in simplified form. Computing system 900 may embody the computer device 10 described above and illustrated in FIG. 1. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 904, and a non-volatile storage device 906. Computing system 900 may optionally include a display subsystem 908, input subsystem 910, communication subsystem 912, and/or other components not shown in FIG. 9.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 906 may be transformed—e.g., to hold different data.

Non-volatile storage device 906 may include physical devices that are removable and/or built-in. Non-volatile storage device 906 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 906, using portions of volatile memory 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 908 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

The following paragraphs provide additional support for the claims of the subject application. One aspect provides a computer device comprising one or more processors configured to receive an end-to-end (E2E) model that has been trained for automatic speech recognition with training data from a source domain, and receive an external language model that has been trained with training data from a target domain. The one or more processors are further configured to perform an inference of the probability of an output token sequence given a sequence of input speech features by computing an E2E model score for one or more candidate output token sequences based on the sequence of input speech features using the E2E model, computing an external language model score for the one or more candidate output token sequences using the external language model, computing an estimated internal language model score for the one or more candidate output token sequences for the E2E model, wherein the E2E model encodes an intrinsic language model and an intrinsic acoustic model, and wherein the estimated internal language model score is computed by removing a contribution of the intrinsic acoustic model, and computing an integrated score for the one or more candidate output token sequences based at least on the E2E model score, the external language model score, and the estimated internal language model score. In this aspect, additionally or alternatively, the E2E model may be trained to minimize a standard E2E model loss. In this aspect, additionally or alternatively, the E2E model may be trained to minimize a weighted combination of an internal language model loss and a standard E2E model loss. In this aspect, additionally or alternatively, the internal language model loss may be determined based on summing negative log probabilities of the intrinsic language model over a training corpus. In this aspect, additionally or alternatively, the integrated score for one or more candidate output token sequence may be computed by subtracting the estimated internal language model score from a log-linear combination of the E2E model score and the external language model score. In this aspect, additionally or alternatively, the one or more processors are further configured to receive a speech input associated with the target domain via an input device, and evaluate a set of input data from the target domain using the trained E2E model implementing language model integration with the trained external language model for the target domain. In this aspect, additionally or alternatively, the E2E model may be a recurrent neural network transducer (RNN-T) model. The RNN-T model may include an encoder, a prediction network, and a joint network that combines an output of the encoder and an output of the prediction network via a feed-forward network. The estimated internal language model score may be computed by removing a contribution of the encoder of the RNN-T model to the feed-forward network. In this aspect, additionally or alternatively, the E2E model may be an attention-based encoder-decoder (AED) model. The AED model may include an encoder that maps sequence of input speech features into a sequence of hidden representations, an attention network that generates attention weights for encoded features in the sequence of hidden representations, a context vector that is computed as a linear combination of the sequence of hidden representations weighted by the attention weights, and a decoder that takes the context vector and a token sequence as input. The estimated internal language model score may be computed by removing a contribution of the encoder to the decoder of the AED model. In this aspect, additionally or alternatively, the E2E model may be trained with training data that includes audio-transcript pairs. In this aspect, additionally or alternatively, the external language model may be trained with training data that includes text data. In this aspect, additionally or alternatively, the integrated score may be estimated at each step of a beam search inference algorithm.

Another aspect provides a method comprising, at one or more processors of a computer device, receiving an end-to-end (E2E) model that has been trained for automatic speech recognition with training data from a source-domain, and receiving an external language model that has been trained with training data from a target-domain. The method further comprises performing an inference of the probability of an output token sequence given a sequence of input speech features by computing an E2E model score for one or more candidate output token sequences based on the sequence of input speech features using the E2E model, computing an external language model score for the one or more candidate output token sequences using the external language model, computing an estimated internal language model score for the one or more candidate output token sequences for the E2E model, wherein the E2E model encodes an intrinsic language model and an intrinsic acoustic model, and wherein the estimated internal language model score is computed by removing a contribution of the intrinsic acoustic model, and computing an integrated score for the one or more candidate output token sequences based at least on the E2E model score, the external language model score, and the estimated internal language model score. In this aspect, additionally or alternatively, the E2E model may be trained to minimize a standard E2E model loss. In this aspect, additionally or alternatively, the E2E model may be trained to minimize a weighted combination of an internal language model loss and a standard E2E model loss. In this aspect, additionally or alternatively, the internal language model loss may be determined based on summing negative log probabilities of the intrinsic language model over a training corpus. In this aspect, additionally or alternatively, the integrated score for one or more candidate output token sequence may be computed by subtracting the estimated internal language model score from a log-linear combination of the E2E model score and the external language model score. In this aspect, additionally or alternatively, the E2E model may be a recurrent neural network transducer (RNN-T) model that includes an encoder, a prediction network, and a joint network that combines an output of the encoder and an output of the prediction network via a feed-forward network, and the method may include computing the estimated internal language model score by removing a contribution of the encoder of the RNN-T model to the feed-forward network. In this aspect, additionally or alternatively, the E2E model may be an attention-based encoder-decoder (AED) model that includes an encoder that maps sequence of input speech features into a sequence of hidden representations, an attention network that generates attention weights for encoded features in the sequence of hidden representations, a context vector that is computed as a linear combination of the sequence of hidden representations weighted by the attention weights, and a decoder that takes the context vector and a token sequence as input, and the method may include computing the estimated internal language model score by removing a contribution of the encoder to the decoder of the AED model. In this aspect, additionally or alternatively, the integrated score may be estimated at each step of a beam search inference algorithm.

Another aspect provides a server system comprising one or more processors configured to receive an end-to-end (E2E) model that has been trained for automatic speech recognition with training data from a source domain. The E2E model encodes an intrinsic language model and an intrinsic acoustic model. The one or more processors are further configured to determine an internal language model loss for the E2E model by summing negative log probabilities of the intrinsic language model over a training corpus, and train the E2E model to minimize a weighted combination of the internal language model loss and a standard E2E model loss.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer device comprising:
one or more processors configured to:
receive an end-to-end (E2E) model that has been trained for automatic speech recognition with training data from a source domain;
receive an external language model that has been trained with training data from a target domain;

perform an inference of the probability of an output token sequence of tokenized text represented by one or more embedding vectors, given a sequence of input speech features by:
  computing an E2E model score for one or more candidate output token sequences based on the sequence of input speech features using the E2E model;
  computing an external language model score for the one or more candidate output token sequences using the external language model;
  computing an estimated internal language model score for the one or more candidate output token sequences for the E2E model, wherein the E2E model encodes an intrinsic language model and an intrinsic acoustic model, and wherein the estimated internal language model score is computed by removing a contribution of the intrinsic acoustic model; and
  computing an integrated score for the one or more candidate output token sequences based at least on the E2E model score, the external language model score, and the estimated internal language model score.

2. The computer device of claim 1, wherein the E2E model has been trained to minimize a standard E2E model loss.

3. The computer device of claim 1, wherein the E2E model has been trained to minimize a weighted combination of an internal language model loss and a standard E2E model loss.

4. The computer device of claim 3, wherein the internal language model loss is determined based on summing negative log probabilities of the intrinsic language model over a training corpus.

5. The computer device of claim 1, wherein the integrated score for one or more candidate output token sequence is computed by subtracting the estimated internal language model score from a log-linear combination of the E2E model score and the external language model score.

6. The computer device of claim 1, wherein the one or more processors are further configured to:
  receive a speech input associated with the target domain via an input device; and
  evaluate a set of input data from the target domain using the trained E2E model implementing language model integration with the trained external language model for the target domain.

7. The computer device of claim 1, wherein the E2E model is a recurrent neural network transducer (RNN-T) model,
  wherein the RNN-T model includes an encoder, a prediction network, and a joint network that combines an output of the encoder and an output of the prediction network via a feed-forward network, and
  wherein the estimated internal language model score is computed by removing a contribution of the encoder of the RNN-T model to the feed-forward network.

8. The computer device of claim 1, wherein the E2E model is an attention-based encoder-decoder (AED) model,
  wherein the AED model includes an encoder that maps sequence of input speech features into a sequence of hidden representations, an attention network that generates attention weights for encoded features in the sequence of hidden representations, a context vector that is computed as a linear combination of the sequence of hidden representations weighted by the attention weights, and a decoder that takes the context vector and a token sequence as input, and
  wherein the estimated internal language model score is computed by removing a contribution of the encoder to the decoder of the AED model.

9. The computer device of claim 1, wherein the E2E model is trained with training data that includes audio-transcript pairs.

10. The computer device of claim 1, wherein the external language model is trained with training data that includes text data.

11. The computer device of claim 1, wherein the integrated score is estimated at each step of a beam search inference algorithm.

12. A method comprising:
  at one or more processors of a computer device:
    receiving an end-to-end (E2E) model that has been trained for automatic speech recognition with training data from a source-domain;
    receiving an external language model that has been trained with training data from a target-domain;
    performing an inference of the probability of an output token sequence of tokenized text represented by one or more embedding vectors, given a sequence of input speech features by:
      computing an E2E model score for one or more candidate output token sequences based on the sequence of input speech features using the E2E model;
      computing an external language model score for the one or more candidate output token sequences using the external language model;
      computing an estimated internal language model score for the one or more candidate output token sequences for the E2E model, wherein the E2E model encodes an intrinsic language model and an intrinsic acoustic model, and wherein the estimated internal language model score is computed by removing a contribution of the intrinsic acoustic model; and
      computing an integrated score for the one or more candidate output token sequences based at least on the E2E model score, the external language model score, and the estimated internal language model score.

13. The method of claim 12, wherein the E2E model has been trained to minimize a standard E2E model loss.

14. The method of claim 12, wherein the E2E model has been trained to minimize a weighted combination of an internal language model loss and a standard E2E model loss.

15. The method of claim 14, wherein the internal language model loss is determined based on summing negative log probabilities of the intrinsic language model over a training corpus.

16. The method of claim 12, wherein the integrated score for one or more candidate output token sequences is computed by subtracting the estimated internal language model score from a log-linear combination of the E2E model score and the external language model score.

17. The method of claim 12, wherein the E2E model is a recurrent neural network transducer (RNN-T) model that includes an encoder, a prediction network, and a joint network that combines an output of the encoder and an output of the prediction network via a feed-forward network, and wherein the method includes computing the estimated internal language model score by removing a contribution of the encoder of the RNN-T model to the feed-forward network.

18. The method of claim 12, wherein the E2E model is an attention-based encoder-decoder (AED) model that includes an encoder that maps sequence of input speech features into a sequence of hidden representations, an attention network that generates attention weights for encoded features in the sequence of hidden representations, a context vector that is computed as a linear combination of the sequence of hidden representations weighted by the attention weights, and a decoder that takes the context vector and a token sequence as input, and wherein the method includes computing the estimated internal language model score by removing a contribution of the encoder to the decoder of the AED model.

19. The method of claim 12, wherein the integrated score is estimated at each step of a beam search inference algorithm.

20. A server system comprising:

one or more processors configured to:

receive an end-to-end (E2E) model that has been trained for automatic speech recognition with training data from a source domain, the E2E model encoding an intrinsic language model and an intrinsic acoustic model;

determine an internal language model loss for the E2E model by summing negative log probabilities of the intrinsic language model over a training corpus; and train the E2E model to minimize a weighted combination of the internal language model loss and a standard E2E model loss, such that an acoustically-conditioned intrinsic internal language model of the E2E model functions as a standalone internal language model.

* * * * *